Figure 1:
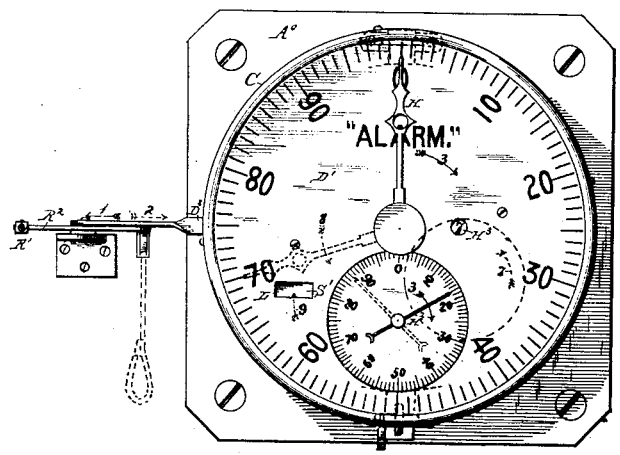

(No Model.) 4 Sheets—Sheet 1.

J. W. FOWLER & D. F. LEWIS.
FARE REGISTER.

No. 271,977. Patented Feb. 6, 1883.

WITNESSES:
W. H. Knight
W. H. Chandler

INVENTORS.
John W. Fowler,
Daniel F. Lewis.
By their Attorney,
Jas. L. Ewin.

(No Model.)  
4 Sheets—Sheet 2.

J. W. FOWLER & D. F. LEWIS.
FARE REGISTER.

No. 271,977. Patented Feb. 6, 1883.

WITNESSES:  
INVENTORS.

(No Model.) 4 Sheets—Sheet 3.
J. W. FOWLER & D. F. LEWIS.
FARE REGISTER.
No. 271,977. Patented Feb. 6, 1883.
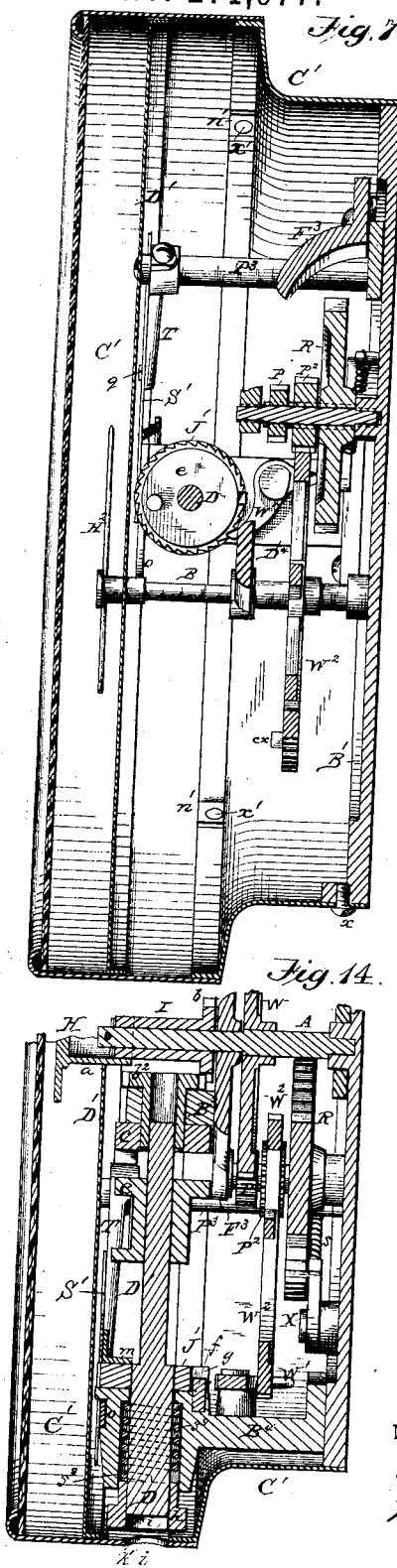
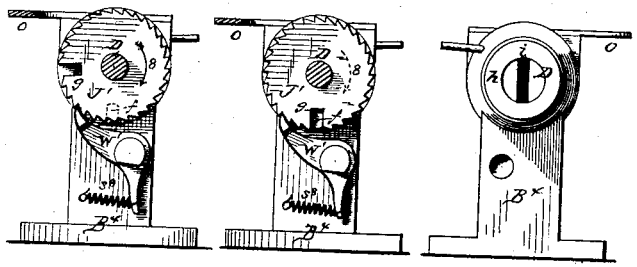
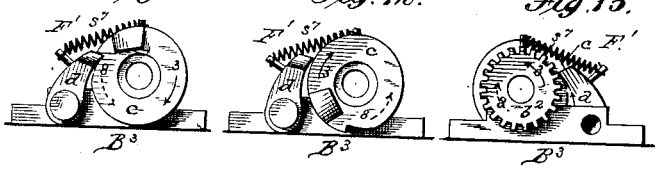
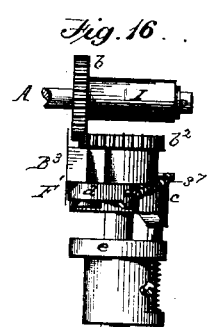
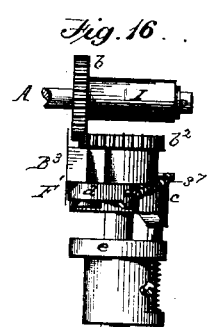
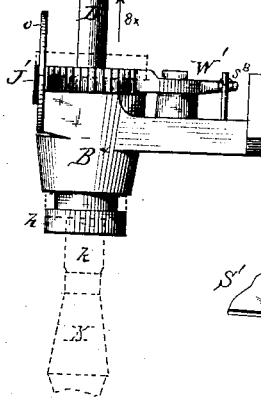
WITNESSES:
W. H. Knight
Wm. H. Chandlee
INVENTORS,
John W. Fowler,
Daniel F. Lewis,
By their Attorney,
Jas. L. Ewin.

(No Model.) 4 Sheets—Sheet 4.

J. W. FOWLER & D. F. LEWIS.
FARE REGISTER.

No. 271,977. Patented Feb. 6, 1883.

WITNESSES:
W. H. H. Knight
Wm. H. Chandler

INVENTORS.
John W. Fowler,
Daniel F. Lewis.
By their Attorney
Jas. L. Ewin.

UNITED STATES PATENT OFFICE.

JOHN W. FOWLER AND DANIEL F. LEWIS, OF BROOKLYN, NEW YORK.

FARE-REGISTER.

SPECIFICATION forming part of Letters Patent No. 271,977, dated February 6, 1883.

Application filed December 13, 1882. (No model.)

*To all whom it may concern:*

Be it known that we, JOHN W. FOWLER and DANIEL F. LEWIS, citizens of the United States, residing at Brooklyn in the State of New York, have invented a new and useful Improvement in Passenger-Registers, of which the following is a specification.

This invention is additional to the series of inventions embodied in our "alarm" registers of different patterns, and described and claimed in United States Patents No. 185,740, dated December 26, 1876, No. 190,021, dated April 24, 1877, No. 206,553, dated July 30, 1878, No. 207,728, dated September 3, 1878, No. 231,161, dated August 17, 1880, and Nos. 247,552 and 247,553, dated September 27, 1881 It is more particularly an improvement on our said registers as provided with our rotary radial key-setting mechanism, successive forms of which, in the order of the dates of our applications for patent, are shown in said Patents No. 190,021, No. 207,728, and No. 206,553. Certain features are applicable, however, to registers provided with either of said previous forms of rotary key-setting mechanism, and others are independent of the setting mechanism, while all or any of the features of this invention hereinafter set forth and claimed may be embodied in registers of other makes, provided their characteristics or organization otherwise be not inconsistent with the construction and mode of operation involved.

The present invention consists in certain novel features of construction and combinations of parts, whereby we accomplish the following beneficial objects—namely: First, to render a rotary radial key-setting mechanism almost wholly independent of the "trip-hand" or its equivalent during the registering movement by coupling and uncoupling the setting-shaft to and from the central gearing, instead of simply clutching and unclutching the key, as heretofore, so as to lessen the work of the friction device or its equivalent, which connects the said trip-hand or its equivalent with the registering mechanism; second, to provide a setting mechanism of the aforesaid description with a "zero-guard" effectively near the hub of the trip-hand or its equivalent, and by the same means in part to provide for coupling and uncoupling the setting-shaft and gearing of said setting mechanism; third, to limit to one direction the rotary motion of the said radial setting-shaft, and by the same means in part to lock said shaft against any rotation until it has been first shifted lengthwise a predetermined distance; fourth, to insure a complete rotation of the setting-shaft at each setting operation independently of the key itself, which may be withdrawn and inserted again at will, and may consequently be of a very simple and durable form and adapted to be quickly and conveniently manipulated, while a screw-driver or the like may be used in its stead should the key be lost or mislaid; fifth, to indicate by a conspicuous visual signal whether or not each begun actuation of said setting-shaft is properly completed, so as to leave the trip-hand or its equivalent at zero. The words "Not set" on a red ground are preferably displayed through an aperture in the white dial-plate in the act of beginning each setting operation, and remain exposed until its completion; sixth, to provide for instantaneously retracting the "setting-signal" at the end of each setting operation without subjecting it to the action of the strong retracting-spring of the setting-shaft; seventh, to provide for effectively supporting the said setting-signal and limiting its retraction by the independent means aforesaid; eighth, to provide for the use of a large dial-plate adapted to bear conspicuous figures and to accommodate an aperture of ample size for the said setting-signal without correspondingly increasing the size of the back plate; ninth, to provide the enlarged case with concealed and internally-guarded sound-escape holes effectively located; tenth, to provide for the use on the large dial-plate of a units-dial for the "permanent" units-hand of proportionate size without complication of parts in the works.

Figure 2:
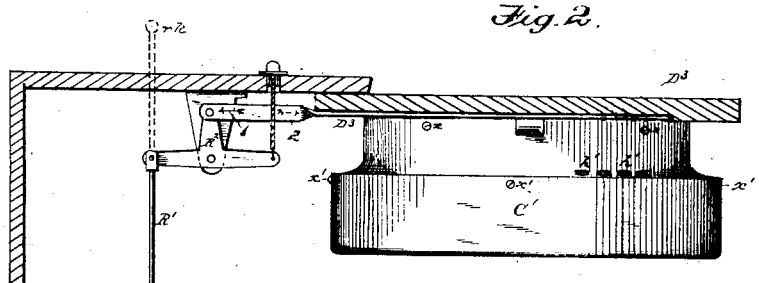
Figure 3:
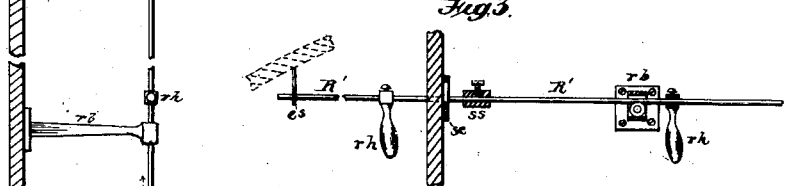
Figure 4:
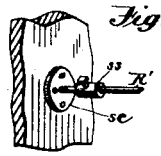
Figure 5:
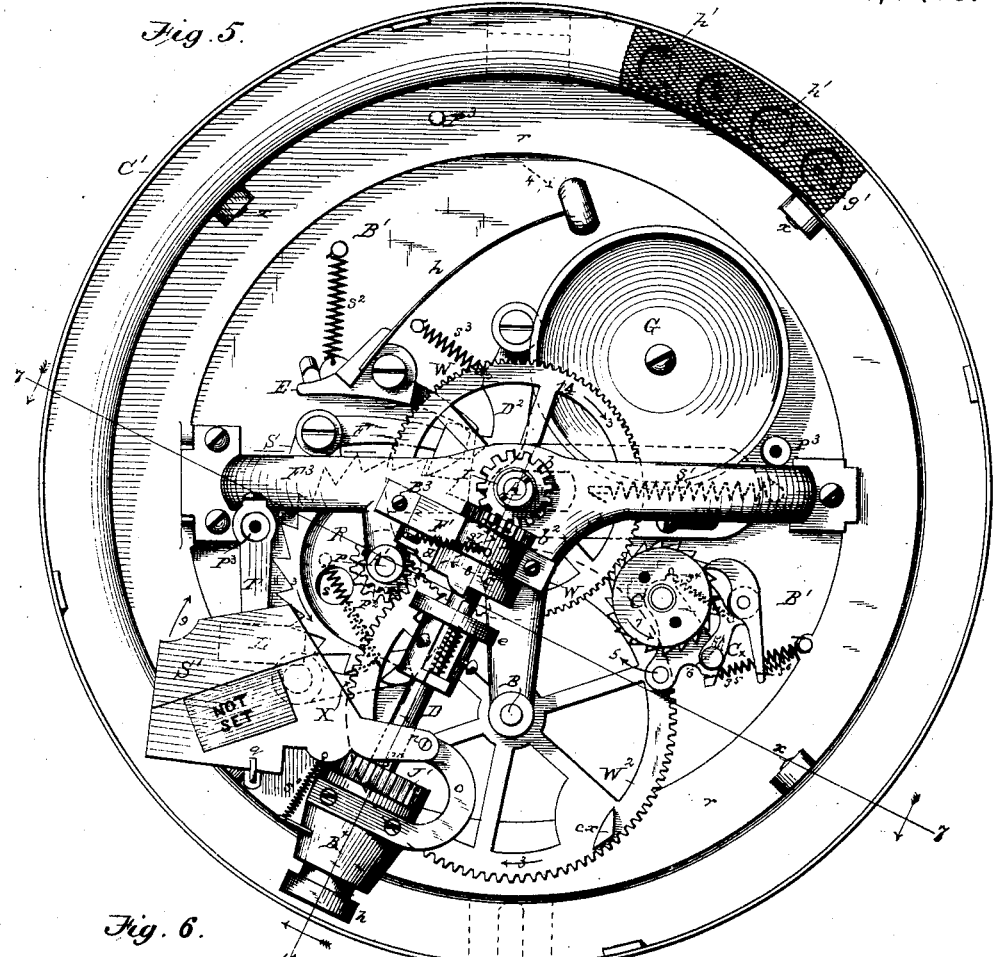
Figure 6:
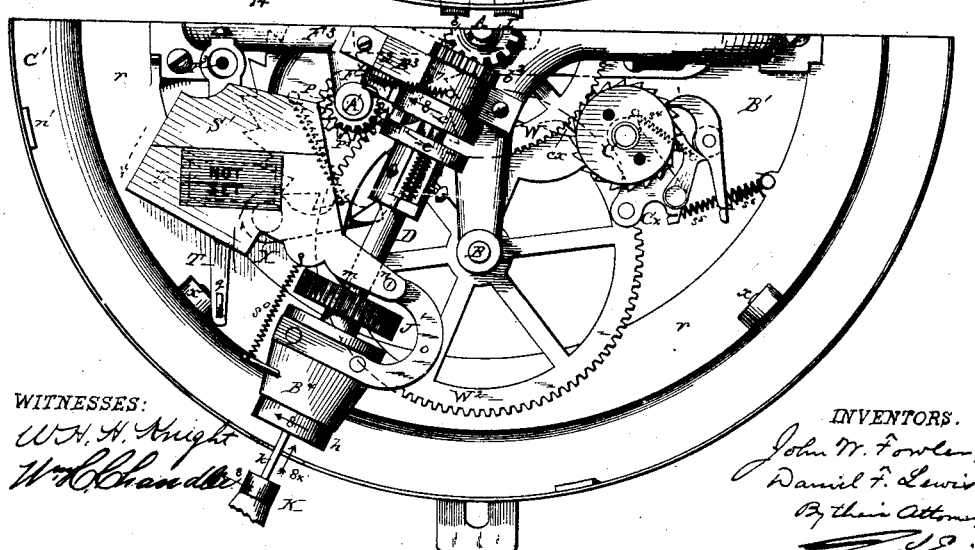
Figure 18:
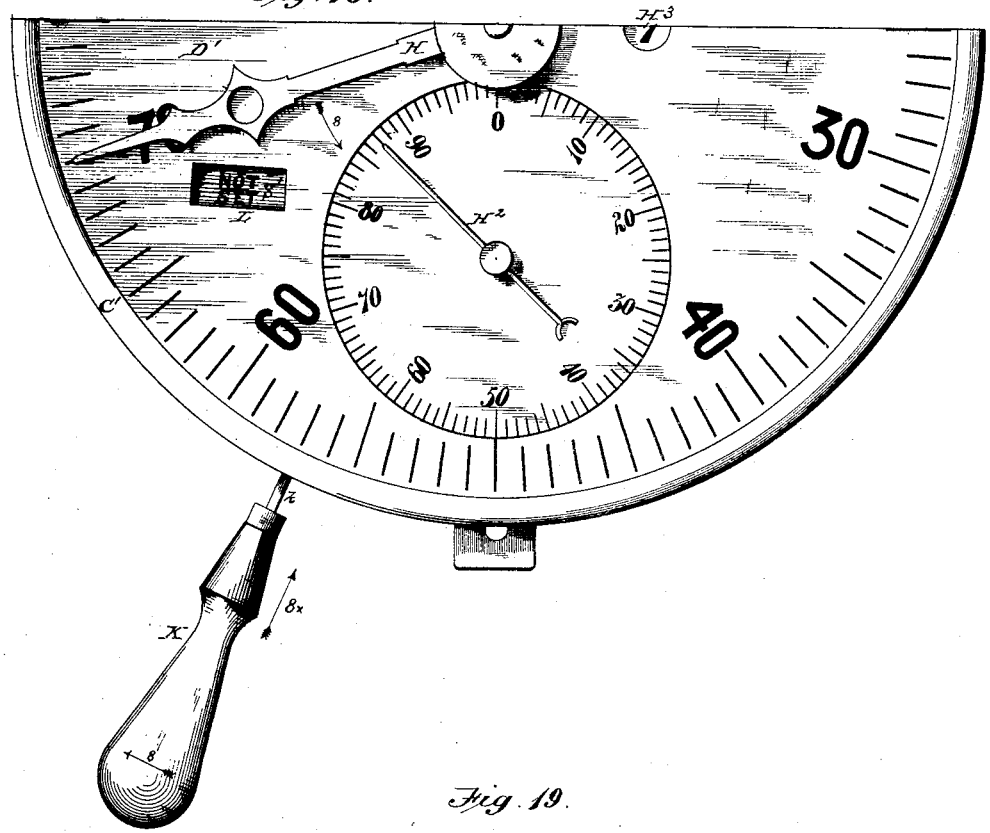
Figure 19:
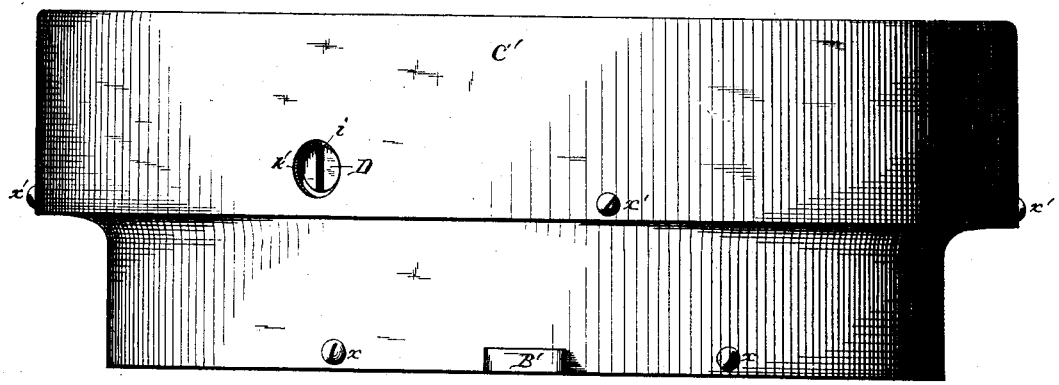
Figure 20:
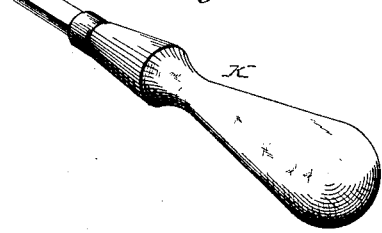

Four sheets of drawings accompany this specification as part thereof. Referring to the figures thereon, Figure 1 is a face view of our new alarm-register embodying our said invention, showing the same as hung in a street-car, with an illustrative "ringing device," of which only a portion, in the plane of the register and beyond, is represented. Fig. 2 is a top view of the same and of other portions of the said ringing device. Fig. 3 is an elevation of a portion of the latter, partly in section; and Fig. 4 is a perspective view of its stop. Fig. 5 is a face view of the register with the front part of its case and its hands and dials removed, showing the works as they appear with the hands as shown in full lines in Fig. 1; and Fig. 6 is a like view of the lower half of the register, showing the works as they appear with the hands as shown in dotted lines in Fig. 1, and with the setting-key inserted. Fig. 7 represents a section through case and dial-plate and works on the line 7 7, Fig. 5, at right angles to the plane of the setting-shaft, showing the latter in cross-section and the lower or outer portion of the setting mechanism in elevation. Fig. 8 is a like view of the outermost parts of the latter alone. Fig. 9 is a duplicate of Fig. 8, showing the parts as moved by inserting and turning the setting-key; and Fig. 10 is a reverse view of said outermost parts of the setting mechanism, showing its lower end. Fig. 11 is a view of the inner part of the setting mechanism from said line 7 7. Fig. 12 is a duplicate of this view, showing the moving parts in the changed positions illustrated by Fig. 6 and by dotted lines in Fig. 1, as aforesaid; and Fig. 13 is a reverse view of said inner part of the setting mechanism, as shown in Fig. 11. Fig. 14 represents a section through the case, dial-plate, and setting mechanism on the line 14 14, Fig. 5; and Figs. 15 and 16 are elevations of the setting mechanism from planes parallel to said section-line, showing its respective sides, Fig. 15 showing also, by dotted lines, the inserted setting-key, with the parts as moved thereby, as seen in Fig. 6. Fig. 17 is a perspective back view of the shank of the setting-signal. Fig. 18 is an external half-face view, showing the parts as in Fig. 6 and in dotted lines in Fig. 1. Fig. 19 is an external view of the lower edge of the register, and Fig. 20 is a detached perspective view of the setting-key. Figs. 1 to 4, inclusive, are drawn to one and the same small scale, and Figs. 5 to 20, inclusive, to another larger scale.

Like letters of reference indicate corresponding parts in the several figures, and arrows, numbered alike in all places, indicate the principal motions of the moving parts.

Our said register is like those described in all our patents aforesaid, excepting said Patent No. 185,740 on the "Fowler attachments," in several fundamental particulars, which will first be mentioned. It has within a circular case, which may be represented by C', and behind its glass front and parallel therewith, as seen in the external face views, Figs. 1 and 18, a circular dial-plate, D', bearing two sets of dial-marks or units-dials, each of one hundred divisions—one concentric with the case, and as large as its circumference will admit, and the other as large as the space below the center within the main units-dial will accommodate. Between the said glass and dial-plate rotary pointers or hands H H² register the passengers as successive units on the respective units-dials, and a rotary "hundreds-dial," H³, exposing its numbers successively through an index-aperture in the said dial-plate, indicates the hundreds registered by said units-hand H² to 2,000, said hand H² and dial H³ turning in one direction only, and forming, with their appurtenances, a "permanent" or "continuous" register, while said hand H—termed the "trip-hand"—besides its forward registering motion, is adapted to be turned backward to set it at zero, or 0, at the end of each trip of a street-car, for example, so that it will show without calculation the number registered during a current trip. Said hands H H² are carried by the outer ends of rotary shafts A B, and said dial H³ by a sleeve-shaft, C. (Shown in the face views of the works, Figs. 5 and 6.) Said hands are rotated synchronously, step by step, in the registering operation during the first or main strokes of a reciprocating main slide, S, by means of said slide S, a feed-pawl or working-pawl, F, carried by said slide, a main ratchet-wheel, R, fast on a shaft, A', parallel to said shafts A and B, and spur-gearing P P² W W² connecting said shafts A', A, and B. A detent-pawl, X, prevents retrogression of the train. A gong-bell, G, is struck once for each unit registered during the return-strokes of said main slide by the coaction of the locked ratchet-wheel R with said pawl F to trip the bell-hammer h. The dial H³ is instantaneously actuated to indicate each hundred registrations by means of a spring put in tension by a projection, cx, on the spur-wheel W² on the shaft B of the permanent hand H². A removable radial setting-key, K, provides for turning the trip-hand H back to zero at will. Provision (broadly speaking) is made for preventing fraudulent manipulation of the trip-hand by the key, as well as by substitutes therefor, and for detecting attempts to so manipulate the trip-hand. The registering mechanism, bell mechanism, and setting mechanism are all solidly supported behind the said dial-plate D' by means of a cast-iron back plate, B', and frame-castings attached to the front thereof, provided with the requisite drilled bearings and studs. Said case C' is attached to the edges of said back plate by screws X, as shown in the external edge views, Figs. 2 and 19, and lugs projecting at top and bottom from said back plate provide for readily "hanging" the register removably upon the face of a hanging-board, A°, more permanently secured in place, as shown in Fig. 1. The respective movements of said main slide are illustrated by arrows 1 2, the said step-by-step units-registering motion by arrows 3, the strokes of the bell by arrow 4, the movements of the hundreds registering mechanism by arrows 5, 6, 7, and said backward rotation of the trip-hand by arrows 8, as in the drawings of said previous patents, and like principal reference-letters have been and will be used to facilitate comparison.

The main actuating mechanism and the bell mechanism—the latter comprising an independent bell-lever, E, and a safey-catch or bell-guard, D², with their appurtenances—are of the description illustrated on Sheets 1 to 3 of the drawings of our said Patent No. 247,552, and claimed in said patent.

The hundreds-registering mechanism, or the particular means by which the dial H³ is rotated as aforesaid, which may be represented by cx, is that claimed in our said Patent No. 206,553, with the modifications set forth in our said Patent No. 231,161. (See the drawings of the latter.)

A frictional setting-hub, I, of the internal construction set forth in our said Patent No. 231,161, connects the trip-hand H with the shaft A, as claimed in said patent, and the trip-hand is attached thereto by an independent frictional hub, a, and the setting motion is transmitted thereto through peculiarly-arranged spur-gears b b², as previously set forth and claimed in our said Patents Nos. 207.728 and 206,553, respectively.

J′ W′ F′ represent respectively the ratchet, pawl, and zero-guard of the present register, corresponding with the Fowler attachments aforesaid (J W F) set forth and claimed in said Patent No. 185,740, and with the peculiarly-operating substitutes therefor set forth and claimed in said Patent No. 207,728. Said parts J′ W′ F′ are, however, of novel construction, and enter into new combinations in the present register, as hereinafter set forth.

Referring again to some of the parts above mentioned to point out their springs, s′ represents the retracting-spring of the main slide S; s, the spring of the detent-pawl X; s², the striking-spring of the bell mechanism applied to the bell-lever E; s³, the spring of the bell-guard D, and s⁴ s⁵ s⁶ the springs of the hundreds-registering mechanism cx. All said springs and those hereinafter named are by preference spiral springs, as represented, made of brass wire of appropriate gages. Springs of this description are readily adapted with great nicety to their individual work, while they are highly efficient and durable and readily applied and replaced, and the manufacture of the register in other particulars is by the same means facilitated.

Referring to the specifications of said previous patents for a fuller description of the aforesaid features together with their modes of operation and advantages, we will proceed now to describe the said ringing device and more particularly to set forth those novel features and combinations in our said new register hereinafter claimed.

R′ R² D³, Sheet 1, represent respectively the principal parts of a rod-ringing device of peculiar construction, the distinctive feature of which is a reciprocating sliding rod, R′, preferably of round iron, provided with conveniently-located ringing-handles rh, and supported horizontally within a street-car by roller-brackets rb, of variable pattern, and above the rear platform, if desired, by an eye-screw, es, for example, as shown in Fig. 3, the rod being extended through the rear end of the car and provided with a stop-sleeve, ss, made fast thereon by a set-screw or set-screws, while a stop-cushion, sc, of sheet-rubber or leather, in the form of a disk, is attached to the inner surface of the car end, as best shown in Fig. 4. A bell-crank lever, R², connects the front end of said rod with a twisted flat bar, D³, which in turn is connected with said main slide S within the register by a stud-pin on the latter projecting rearwardly through a slot between a pair of lugs cast on the back plate, as seen in Fig. 2. The inner end of said bar D³ is guided by said lugs and traversed by said stud-pin, and through these connections said main slide is moved in both directions by said ringing-handles without reliance on its retracting-spring, strain in the direction of the main stroke being effectively guarded against by said stop and its cushion and in the opposite direction by the sound of the bell at the end of the return-stroke.

A double bell-crank lever, R², heretofore used with its front platform pulling-strap of round leather running over a pulley, has been used in connection with the rod R′, as shown in Figs 1 and 2. Instead of this, a single bell-crank may be used with an extension of the rod R′, terminating in a ringing-knob, rk, over the front platform, as indicated in dotted lines in Fig. 1. In either case provision is made for the operation of the said main slide from all parts of the car by the conductor, as indicated by arrows 1 2. Registrations are thus made or by any preferred ringing or "pulling" device, as illustrated by arrows 3 and 5 to 7, and each completed registration is attested by an audible signal from the bell within, as illustrated by arrow 4, as aforesaid, while ringing the bell without first registering a unit is precluded by the organization of the mechanism. In Fig. 1 the hands H H² are shown respectively at zero ("set,") and at "17," and in dotted lines as they appear after seventy registrations, pointing respectively to "70" and "87."

To provide more effectually and by more convenient and durable means for setting the trip-hand fully back to zero at the end of each trip and leaving it there, we construct our improved setting mechanism and its appurtenances as follows: The said gear b², Figs. 5 and 6 and 13 to 16, instead of being fast on the setting-shaft D, as heretofore, is separate, being constructed with a sleeve-hub and mounted in a pillow-block, B³, which is secured upon a supporting-surface of the "spider-frame" F³, a little below and to the left of its middle, by screws, the inner end of said setting-shaft being supported within said sleeve-hub of the gear, but so that the latter may rotate freely independently thereof, and so that said shaft may slide lengthwise independently. A collar, c, fast on the protruding outer end of said sleeve-hub (shown also, and best shown in Figs. 11 and 12) is constructed with a peripheral notch as part of the said zero-guard F′, a detent-pawl, d, which, with its spring s⁷, completes said zero-guard, being pivoted to a lug on said pillow-block, and so constructed and arranged that the square shoulder of said notch abuts against the end of said pawl when the trip-hand H is at zero, as best shown in Figs. 11 and 16. It consequently arrests the trip-hand at zero in the setting operation and precludes turning said hand backward past zero, while it offers no resistance practically to the rotation of the trip-hand past zero in the registering operation, should more than one hundred passengers be registered during a trip. The parts are shown as they appear after seventy registrations in Figs. 6 and 12, and their movements with the registering mechanism and with the setting mechanism are indicated respectively by arrows 3 and 8. Said collar $c$ is further constructed with a single clutch stud or spur on its face, (best seen in Figs. 11, 12, and 15,) and a clutch-collar, $e$, provided with a spring-projected yielding clutch-pin to engage with said stud, (best seen in Figs. 5, 7, and 15,) is fastened upon the setting-shaft D by set-screws, and serves, in connection with said collar $c$, to unite said shaft, through said gears $b^2 b$ and hub $a$, with said trip-hand for rotation backward, as indicated by arrows 8, when said shaft D is thrust inward, as shown in Fig. 6 and by dotted lines in Fig. 15, and indicated by arrow $8^x$. Should said stud be opposite said clutch-pin when the setting-shaft is thrust inward, (owing to the registration of one hundred and one or one hundred and two, or only one or two, during a trip,) the clutch-pin yields to permit the inward movement and springs out when turned sufficiently. In any case the setting-shaft must be turned until said clutch-pin, pressing against the square face of said stud, thereby turns the collar $c$, gears $b^2 b$, hub $a$, and the trip-hand H backward, as aforesaid.

The outer end of the setting-shaft D is of larger diameter than the part already described, and is supported by a bracket, $B^4$, Figs. 5 to 10 and 14 to 16, attached by screws to the back plate, $B'$, in line radially with the said pillow-block $B^3$, about twenty-five degrees to the left of a vertical line running through the axes of the shafts A and B. The pawl W' of the ratchet and pawl J' W' (best seen in Figs. 8 and 9) is attached by a pivotal screw to the back of said bracket, and is provided with a spiral spring, $s^8$: and said part J', being a disk, with peripheral ratchet-teeth, integral with the setting-shaft, coacts with said pawl to limit to one direction the rotary motion of the setting mechanism, and also coacts with a locking-stud, $f$, on the back of said bracket $B^4$, being itself constructed with a matching-socket, $g$, which, when the trip-hand has been turned to zero by the setting mechanism, is occupied by said stud, or is in position for said stud to enter it when the setting-shaft is retracted. The latter is so retracted automatically by a strong spiral spring, $s^9$, Fig. 14. This spring surrounds the setting-shaft above a collar, $h$, on its extreme lower end, within the body of the bracket $B^4$, which is counterbored to receive said spring, as clearly shown in Fig. 14. When the setting-shaft is thrust inward, as indicated by arrows $8^x$, so as to clear the disk J' from said locking-stud, it is coupled with the setting-gears, as aforesaid. It can now be rotated, provided the trip-hand is not already at zero, but only in the proper direction to set the trip-hand, as indicated by arrows 8, and until it is so thrust inward it is locked against any rotation whatever. Said locking-stud $f$, as illustrated by Fig. 10, coacting with the back of said disk J' when said disk is turned with the setting-shaft until said socket $g$ is out of line with said stud, keeps the setting-shaft and gears in clutch throughout the setting operation without extraneous aid. This enables us to use a key, K, removable at will, in connection with a rotary setting mechanism, without losing the advantage of locking the trip-hand against rotation by registrations should it be set back only partially. It is so locked by the coaction of the clutch-stud and clutch-pin of the collars $c e$ at the inner end of the setting-shaft and said ratchet and pawl J' W' at its outer end. The key K, which is made similar to a short screwdriver, is shown in perspective in Fig. 20. Owing to its simple form, it is adapted to be made very strong and durable, and to be very readily manipulated with all the power requisite to turn a trip-hand of the largest size against the resistance of friction-springs adequate to its demands, as well as with less power where less is sufficient. The large outer end of the setting-shaft is cut through centrally from front to rear, forming within said collar $h$ a socket, $i$, to receive the key-bit $k$, and the end of the setting-shaft containing said socket is exposed by a circular key-hole, $k'$, Figs. 14 and 19, in the case C'.

For additional security, a "setting-signal," S', Figs. 1, 5, 6, 7, 14, 17, and 18, is located within the left-hand side of the register and exposed through an aperture, L, in the dial-plate. (The position of said aperture is indicated by dotted lines in Figs. 5 and 6.) The body of the signal, as we prefer to construct it, is of sheet metal, (zinc,) having cemented to its upper surface a piece of white paper and a piece of red paper to contrast with the white paper with which our dial-plates are preferably covered, said red paper bearing the words "Not set" in printed characters, which form its successively-exposed faces in a convenient manner. The exposure of its white face is illustrated by Figs. 1 and 5 and the exposure of "not set" by Figs. 6 and 18. The former is during the registering operation or until the setting-key K is inserted. "Not set" is exposed by the movement illustrated by arrow 9 as soon as the setting-shaft is thrust inward by means of the key, (arrows $8^x$,) and remains exposed after the least turn of the setting-shaft and trip-hand (arrows 8) until the latter is turned back to zero, and is left there by allowing the setting-shaft to spring outward to its position of rest. (Illustrated by Figs. 5, 7, 8, 10, 11, 13, 14, and 16, and by the full-line position in Fig. 15.) The other positions of the setting-shaft are in practice only momentary, unless there is an attempt to "manipulate" the register for the accomplishment of fraud. The shank of the signal S' (shown inverted in Fig. 17) is provided with an angle-piece of heavier metal to form a rigid projection, $m$, engaging with the inner face of the disk J', and it is pivoted by an attaching-screw, $n$, to the extremity of a flat bar, $o$, of J shape, which is fixedly attached to the top of the bracket B⁴ by screws. Said projection $m$ is not coupled with the disk J', which would cause the signal to be retracted in unison with the setting-shaft; but a suitable light spiral spring, $s^o$, is stretched therefrom to a stud-pin on the bracket B⁴, as clearly shown in Figs. 5 and 6.

To support the free outer end of the signal S', one of three posts P³ projecting from the back plate, B', is provided with an arm, T, Figs. 5, 6, 7, and 14, attached by a set-screw, and having a notched stop-lug, $q$, on its upper surface, near its outer end, to arrest the signal in its position of rest when it is retracted by its spring $s^o$.

The setting operation is illustrated by Figs. 6, 9, 12, 15, and 18, and by arrows 8ˣ, 8, and 9, as aforesaid. Supposing that seventy fares have been registered during a trip, as in the illustration, the position of the key-socket $i$ remains unchanged, and the bit $k$ of the key K is readily thrust into it through the key-hole $k'$, as illustrated by arrows 8ˣ. By the same movement the setting-shaft D is thrust inward by the key, moving the clutch-collar $e$ into clutching relation with the collar $c$, disengaging the stop-socket $g$ in the disk J' from the locking-stud $f$, and displaying "Not set" on the signal S' through the aperture L, as indicated by arrow 9. The parts are shown at this stage in all said figures except Fig. 9. The key K, and therewith the parts D J' $e$, now turn freely in the direction of arrows 8. The first effect of this movement is the locking of said parts D J' $e$ and the setting-signal S' against retraction by the coaction of said locking-stud $f$ with the back of the disk J'. The completion of thirty one-hundredths of a rotation in the illustration brings the clutch-pin of the collar $e$ against the face of the clutch-stud on the collar $c$. Said clutch-collar $c$, and therewith the parts $b^2$ $b$ I $a$, and the trip-hand H, are now rotated by the key in the same direction. Reverse motion by the key is precluded by the pawl W', which remains in mesh with the ratchet-teeth on the disk J' at all times. When said rotation is properly continued to completion the square shoulder of the peripheral notch in the collar $c$ comes against the end of the detent-pawl $d$ in the zero-guard F', (as shown in Fig. 5, for example,) and the trip-hand is stopped at zero. Further motion in the direction of arrows 8 is now precluded by said zero-guard, while reverse motion is still precluded by the ratchet and pawl J' W', as aforesaid. The key is now withdrawn and the said parts D J' $e$ and the setting-signal S' are retracted respectively by the springs $s^9$ $s^0$. No effect follows insertion of the key when the trip-hand is set, save the exposure of "Not set" while the key is held in. Should the trip-hand be set only partially, leaving it, say, at 10, it will be locked in this position by the coaction of said clutch-pin and clutch-stud and said pawl and ratchet, as aforesaid, so as to create a discrepancy between the indication of the permanent register and the sum of the indications of the trip-hand, which should be exactly equal, as the locking simply extends to the trip-hand and setting mechanism, and not to the registering mechanism, and the latter must first be actuated in order to ring the bell, as hereinbefore and in our previous specifications fully set forth. Subsequent setting cannot, of course, correct such discrepancy. Moreover, the said setting-signal will show "Not set" (or any equivalent of this indication which may be preferred) so long as the trip-hand is so locked, and tends to prevent such disarrangement of the apparatus by fruitless attempts on the part of dishonest conductors and officers, as well as accidental omissions to fully set the trip hand. Its latter and more important office takes from dishonest or careless officials all excuse should disarrangement be discovered.

The posts P³ are designed primarily to support the dial-plate D', which is attached to two of them by screws, their outer ends being drilled and tapped for this purpose, as indicated. The present dial-plate, which is thus supported independently of the frame F³ and bracket B⁴, is of extraordinarily large size, and is accommodated, without a corresponding increase in the diameter of the back-plate, by constructing the case O', Figs. 1, 2, 5, 6, 7, 14, 18, and 19, in two parts, of spun sheet metal, with a lap-joint in about the plane of the setting-shaft D, the front part fitted to the dial-plate D' and provided with the glass behind an inturned edge, while the rear part is fitted to the back plate, B', to which it is attached by screws $x$, as aforesaid, and is enlarged at its outer edge by a spun offset, which is flanged and provided with attached nuts $n'$, to receive screws $x'$, by which the two parts are united. In gaining access to the works for cleaning or repairs the front part of the case is quickly removed, the screws $x'$ being most convenient of access, while the rear part of the case may remain attached to the back plate. Said construction of the case O' provides additionally for locating sound-escape holes $h'$, Figs. 2 and 5, in said offset, where they are concealed from view, while the attachment of wire-gauze $g'$ internally, to guard said holes, is greatly facilitated by this location and the division of the case, as aforesaid, as is well illustrated by Fig. 5.

In order to make the units-dial behind the permanent hand H², Figs. 1 and 18, proportionate in size to the enlarged main dial, it was necessary to reorganize our registering mechanism, in view of the changed location of the shaft B thereby involved. We finally accomplished this, without complication of parts and by only a slight enlargement of the back plate in the form of a flat rim, $r$, by the employment of a spur-wheel, $W^2$, of larger diameter, on said shaft B, and correspondingly increasing the motion transmitted thereto by a second pinion, $P^2$, on the driving-shaft $A'$, as shown in Figs. 5 to 7.

We do not wish to limit ourselves to details of make not essential to the respective features and combinations hereinafter claimed, nor to the use of hands or pointers, because of the well-known substitutes therefor; and our improved register may be employed for various uses with or without special adaptation, the same as other passenger-registers.

We do not claim herein our said rod-ringing device, but hereby reserve the right to claim the same in a future application for patent.

We claim as new and desire to patent under this specification—

1. The combination, in a register, substantially as herein specified, of an inwardly-yielding radial setting-shaft adapted to be thrust inward and rotated, a clutch at the inner end of said setting-shaft, a pair of setting-gears united respectively with a clutch-collar and a frictional setting-hub, and a trip-hand or its equivalent carried by this hub, for the purpose set forth.

2. The combination, in a register, substantially as herein specified, of an inwardly-yielding radial setting-shaft adapted to be thrust inward and rotated, a clutch at the inner end of said setting-shaft, a pair of setting-gears united respectively with a clutch-collar and a frictional setting-hub, a trip-hand or its equivalent carried by said hub, and a zero-guard formed by a peripheral notch in said clutch-collar and a coacting detent-pawl, as shown, for the purposes set forth.

3. The combination, in a register, substantially as herein specified, of an inwardly-yielding radial setting-shaft, adapted to be thrust inward and rotated, to set the trip-hand or its equivalent, a fixed bracket supporting the outer end of said setting-shaft and provided with a locking-stud and detent-pawl on its back, and a disk on said shaft provided with a stop-socket and peripheral ratchet-teeth, to engage respectively with said locking-stud and pawl and disengaged from the former only by said inward movement, for the purposes set forth.

4. The combination, in a register, substantially as herein specified, of a setting-key removable at will, with an inwardly-yielding radial setting-shaft, adapted to be thrust inward and rotated by said key, to set a trip-hand or its equivalent, a clutch which couples said setting-shaft with parts rotating in unison with said trip-hand or its equivalent while said setting-shaft is in its inner position, a ratchet and pawl limiting the rotation of said setting-shaft to a backward direction, and a locking device independent of the key for preventing the retraction of said setting-shaft until it has made a complete rotation when it is once turned, for the purposes set forth.

5. The combination, in a register, substantially as herein specified, of inwardly-yielding setting parts, adapted to be thrust inward and rotated, to set a trip-hand or its equivalent, and a setting-signal, connected with one of said setting parts, and exposing the indication "Not set" or its equivalent while said setting parts are in their inner position.

6. The combination, in a register, substantially as herein specified, of inwardly-yielding setting parts, adapted to be thrust inward and rotated, to set a trip-hand or its equivalent, a setting-signal connected with one of said setting parts and exposing the indication "Not set" or its equivalent while said setting parts are in their inner position, and springs retracting said setting parts and setting-signal independently.

7. The combination, in the within-described register, of one of the posts $P^3$, which support the dial-plate, the arm T, supported by said post behind and parallel to said dial-plate and constructed with a stop-lug, and the swinging setting-signal $S'$, with its retracting-spring, substantially as herein specified.

8. The combination of the circular back plate, $B'$, the relatively large circular dial-plate $D'$, and the spun sheet-metal case $C'$, of two diameters, having a circumferential lap-joint in front of an offset, substantially as herein specified, for the purpose set forth.

9. The spun sheet-metal case $C'$, of two diameters, having a circumferential lap-joint in front of an offset, and provided with sound-escape holes $h'$ in said offset, with wire-gauze $g'$, to guard the latter, applied internally to said offset, as shown, for the purpose set forth.

10. The driving-shaft $A'$ provided with the independent pinion $P^2$, the units-shaft B, provided with the large spur-wheel $W^2$, and located as described, and the permanent hand $H^2$, carried by this shaft, in combination with the circular back plate, B, bearing this and the remainder of the registering mechanism, and the main actuating mechanism thereon, and the relatively large dial-plate $D'$, marked with a secondary units-dial of proportionate size, concentric with said shaft B, as shown, for the purpose set forth.

JNO. W. FOWLER.
DANIEL F. LEWIS.

Witnesses:
ELDREDGE PACKER,
F. E. WRIGLEY.